(12) United States Patent
Shimizu et al.

(10) Patent No.: US 6,614,627 B1
(45) Date of Patent: Sep. 2, 2003

(54) MAGNETIC DISK APPARATUS

(75) Inventors: Toshihiko Shimizu, Yasato (JP); Hiromitsu Masuda, Chiyoda (JP); Irizo Naniwa, Higashimurayama (JP); Mikio Tokuyama, Tsukuba (JP); Shigeo Nakamura, Odawara (JP); Kousaku Wakatsuki, Odawara (JP); Haruhide Takahashi, Odawara (JP); Masaki Odai, Chiyoda (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/649,614

(22) Filed: Aug. 29, 2000

(30) Foreign Application Priority Data

Feb. 14, 2000 (JP) .................................. 2000-039726
Apr. 11, 2000 (JP) .................................. 2000-115776
May 26, 2000 (JP) .................................. 2000-156926

(51) Int. Cl.⁷ ............................................... G11B 5/56
(52) U.S. Cl. .................................. 360/294.4; 360/294.6
(58) Field of Search ........................ 360/294.4, 294.3, 360/294.6

(56) References Cited

U.S. PATENT DOCUMENTS 5,764,444 A * 6/1998 Imamura et al. ......... 360/294.4
5,898,544 A    4/1999 Krinke et al.
6,188,548 B1 * 2/2001 Khan et al. ............... 360/294.4
6,239,953 B1 * 5/2001 Mei ......................... 360/294.4
6,362,938 B1 * 3/2002 Suzuki et al. ............ 360/294.4

FOREIGN PATENT DOCUMENTS

| JP | 6-20415 | 1/1994 |
| JP | 9-82048 | 3/1997 |
| JP | 11-16311 | 1/1999 |
| WO | WO 9966501 A1 | 12/1999 |

* cited by examiner

Primary Examiner—Robert S. Tupper
(74) Attorney, Agent, or Firm—Antonelli, Terry, Stout & Kraus, LLP

(57) ABSTRACT

A magnetic disk apparatus of the present invention is equipped with a microactuator for micro motion using piezoelectric elements in addition to a coarse adjustment actuator such as a voice coil motor or the like, eliminates parts that slide between the microactuator and surrounding members, and alleviates stress on the piezoelectric elements even if an impact is given to the magnetic disk apparatus. Thus, a first actuator fixing portion on a carriage side and a second actuator fixing portion on a magnetic head side of a microactuator mounting portion are coupled with a plurality of flexible coupling portions and coupling portions are placed outside the microactuator in substantially symmetric with respect to a centerline in a longitudinal direction of a suspension.

12 Claims, 15 Drawing Sheets

(a) SHAPE A (b) SHAPE B (c) SHAPE C

MAGNETIC DISK APPARATUS

BACKGROUND OF THE INVENTION

The present invention relates to a magnetic disk apparatus, and more particularly, to a head support mechanism incorporating a microactuator for precise positioning of a magnetic head on a target track and a magnetic disk apparatus using the same.

With an increasing capacity of a magnetic disk apparatus in recent years, the magnetic head is required to perform extremely high precision positioning on a target track. Therefore, a drive mechanism has been proposed for a magnetic disk apparatus with a structure comprising a voice coil motor provided opposite to the magnetic head with respect to a carriage rotation center, which allows the magnetic head to move roughly, and an actuator for micro motion provided at a suspension.

For example, JP-A-11-16311 discloses a structure in which a micro actuator is provided between a load beam and a suspension provided with a magnetic head in addition to a coarse adjustment actuator.

Furthermore, JP-A-9-73746 discloses a head support apparatus comprising a head that performs data recording/reproduction on a disk that is driven to rotate and a plate-like elastic body having a first end and a second end. The head is mounted on the first end. The second end is provided with a load beam pivotally supported to move the head in a substantial radial direction of the disk, first and second piezoelectric thin films provided substantially in parallel to a longitudinal direction of the load beam on one surface of this load beam, third and fourth piezoelectric thin films provided substantially in parallel to the longitudinal direction of the load beam on another surface of the load beam and opposed to the first and second piezoelectric thin films, and first to fourth electrode pairs to apply voltage to the first to fourth piezoelectric thin films in their thickness direction, respectively.

In the above described prior art example, by applying voltage signals to the first to fourth electrode pairs so that, for example, the first and third piezoelectric thin films, and the second and fourth piezoelectric thin films expand and contract in phase, while the first and second thin piezoelectric films, and the third and fourth piezoelectric thin films expand and contract in inverse phase, high precision micro displacements for tracking compensation are given to the head.

For the microactuator, an electromagnetic type using a coil and a magnet has been conventionally considered, but recently a piezoelectric type using a piezoelectric element such as PZT is increasingly put into practical use from the standpoint of rigidity and manufacturing costs.

However, in the prior art structure with an entire piezoelectric element directly connected to a non-self-deforming plate-like load beam, the load beam constitutes large resistance against expansion and contraction of the piezoelectric elements. Thus, it is necessary to apply a voltage as high as 50V to the piezoelectric elements in order to move the head by 0.3 $\mu$m in the head positioning direction.

Furthermore, the piezoelectric element is made of a brittle member, and therefore it has disadvantages that it is vulnerable to impacts and sliding and is likely to produce dust from the sliding portion or portions on which stress is concentrated at the time of receiving an impact or at the time of driving the piezoelectric element. In the magnetic disk apparatus, a distance (flying height) between a flying side of the slider on which the magnet head is mounted and the disk surface is extremely small in the order of several tens of nm from the standpoint of improving the recording density. Therefore, if dust is produced, it becomes difficult to keep an appropriate flying height and it becomes impossible to perform the recording/reproduction. The slider or disk can be damaged in the worst case, leading to deterioration of reliability of the magnetic disk apparatus. Because of this, when using the piezoelectric element, there is a problem that it is necessary to eliminate the sliding portion and minimize stress produced when an impact is given from outside the magnetic disk apparatus or when the piezoelectric element is driven as small as possible.

OBJECT AND SUMMARY OF THE INVENTION

An object of the present invention is to provide an actuator structure and a magnetic disk apparatus using the same that solves at least one of the above problems, with a simple structure with less sliding portion, capable of performing accurate positioning.

To attain the above object, a window is provided in a portion on which a microactuator is mounted, and outer frame portions of the window in the longitudinal direction of the suspension are made by flexible coupling members extensible and contractible in the longitudinal direction of the suspension by projecting the outer frame portions outwardly from the mount portion or by forming them in a bellow shape. Alternatively, a flexible coupling member extensible and contractible in the longitudinal direction is provided on a centerline of the window in the longitudinal direction of the suspension and piezoelectric elements of the microactuator are respectively disposed between the outer frame portions of the window and the coupling member.

With these structures, the microactuator does not come into contact with other members except fixed parts thereof during operation and at impact. Therefore, it is possible to avoid dust due to sliding. Furthermore, the coupling member shares stress generated at impact, and freely deforms during operation, making it possible to reduce concentration of stress on the microactuator and improve reliability of the magnetic disk apparatus.

DESCRIPTION OF THE EMBODIMENTS

With reference now to the accompanied drawings, embodiments of the present invention will be described in detail hereinafter.

Figure 1:
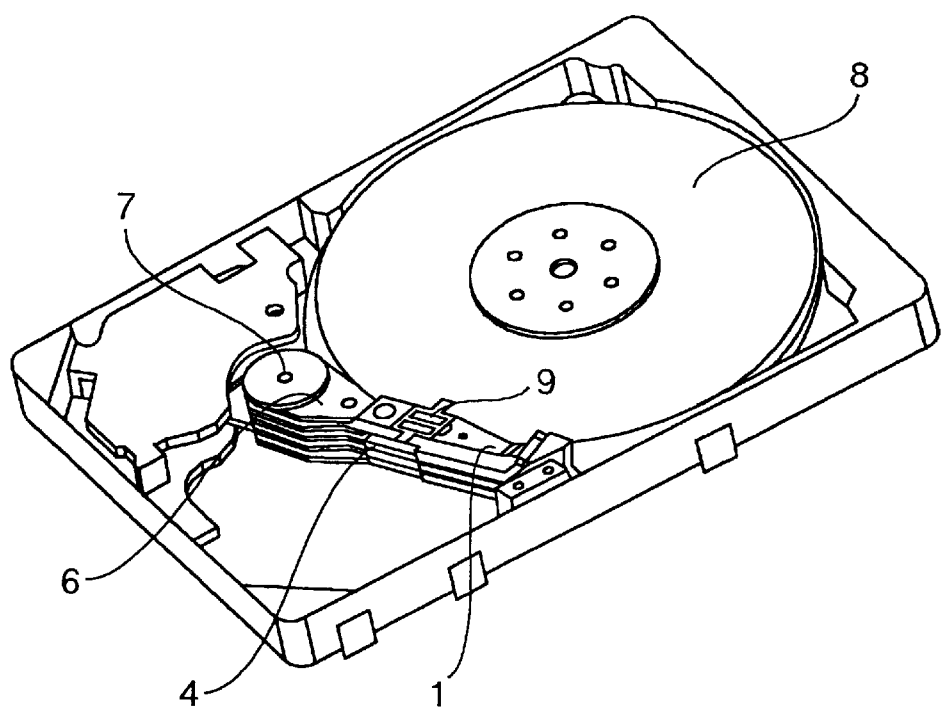
FIG. 1 is a perspective view of a magnetic disk apparatus of a first embodiment of the present invention.
Figure 2:
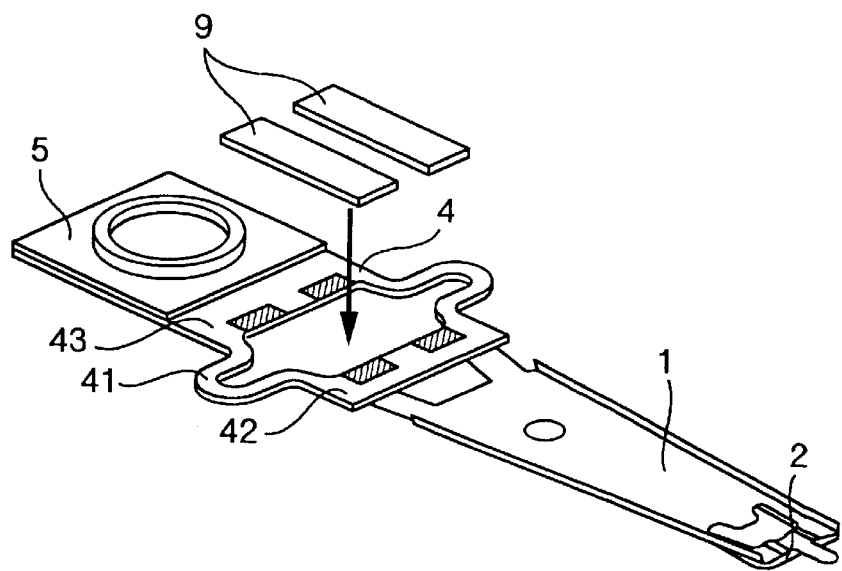
FIG. 2 is a perspective view of a suspension of the first embodiment of the present invention.
Figure 3:
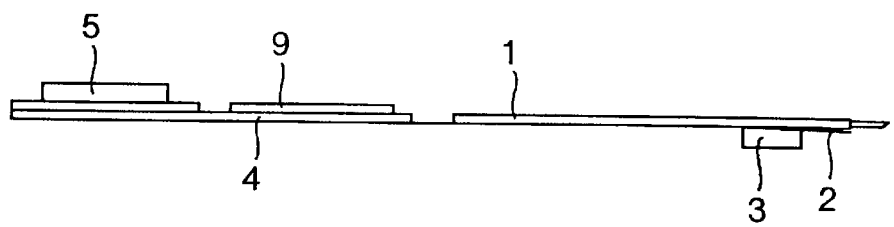
FIG. 3 is a side view of the suspension of the first embodiment of the present invention.
Figure 4:
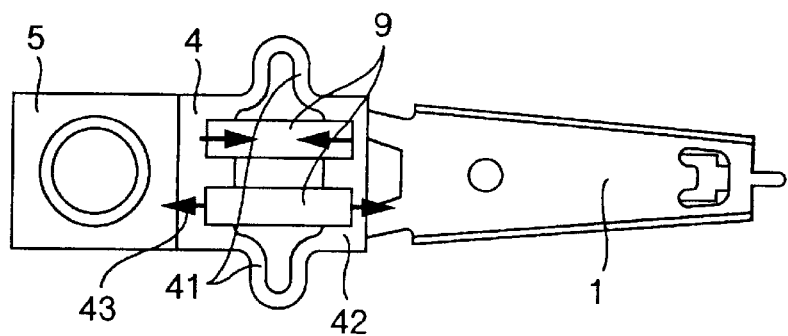
FIG. 4 is a top view of the suspension of the first embodiment of the present invention.

FIG. 1 is a perspective view of a magnetic disk apparatus to which the present invention is applied, FIG. 2 is a perspective view of its suspension (head support mechanism), FIG. 3 is a side view of the suspension and FIG. 4 is a top view of the suspension.

In the embodiment shown in FIG. 1 to FIG. 4, a slider 3 on which a magnetic head is mounted via a flexure 2 is attached at an end of a load beam 1. The load beam 1 is fixed to a microactuator mounting portion 4 by welding, etc. and the microactuator mounting portion 4 is fixed to a mount 5 by welding, etc. The mount 5 is fixed to a carriage 6 by swaging, etc. When the carriage 6 rotates around a pivot axis 7 by a drive force of a voice coil motor, the magnetic head can access an arbitrary radius position on a disk 8. Furthermore, a microactuator 9 structured by piezoelectric elements are fixed to the microactuator mounting portion 4. Fine positioning of the magnetic head is performed by driving the microactuator 9.

The hatching areas of FIG. 2 indicate positions at which the microactuator 9 is fixed. The hatching areas are preferably processed by etching, etc. to have a recessed shape to facilitate positioning of the microactuator. The microactuator mounting portion 4 of this embodiment is configured by arm portions 41, microactuator fixing portions on the magnetic head side 42 (mounting portions on the movable side) and microactuator fixing portions on the carriage side 43 (mounting portions on the fixed side) as one body. The arm portions 41 are arranged outside the centerline in the longitudinal direction so that it does not come into contact with or slide against the microactuator 9. In this embodiment, the arm portions 41 are outwardly projected out of the sides of the microactuator fixing portions. It is preferable that the microactuator mounting portion 4 has a thickness of 0.15 mm to 0.3 mm to avoid excessive deformation when it receives an impact and reduce the overall height of the suspension. This microactuator mounting portion is processed to have a concave shape by etching, etc. facilitating positioning and mounting the microactuator 9 onto this area.

Furthermore, it is preferable that microactuator mounting portion 4 itself be punched out by press working or formed by etching to reduce manufacturing tolerance and reduce manufacturing costs.

Figure 12:
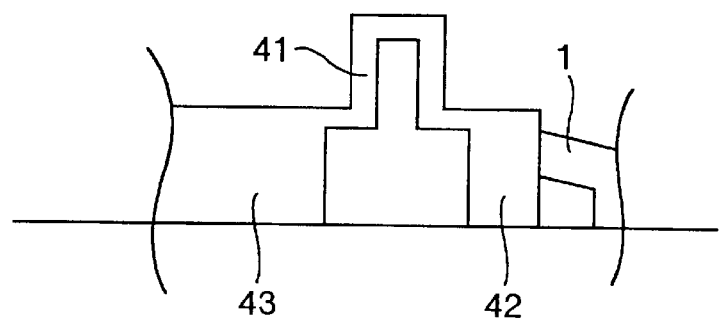
FIG. 12 is a view illustrating a basic shape of an arm portion of the first embodiment of the present invention.

FIG. 12 shows an example of the shape of the arm portion. The arm portion 41 in FIG. 2 to FIG. 4 has the shape in FIG. 12 as the basic shape, which has a curve instead of a square to reduce stress concentration of the arm portion. The arm portion 41 must be flexible so that it does not interfere with the operation of the microactuator 9. For this purpose, it is effective to increase the path length of the arm portion (length along the centerline of the shape) and reduce the width of the arm portion.

However, as an overall width of the suspension (the distance between the furthest points viewed from the centerline in the longitudinal direction of the suspension) increases, moment of inertia with respect to an center axis in the longitudinal direction of the suspension increases, and thus torsion vibration of the suspension about the center axis in the longitudinal direction, resulting in a problem of adversely affecting the magnetic head positioning operation. Thus, it is preferable that the arm portion has a shape that reduces the overall width of the suspension and has a large path length. To meet such requirements, by making the arm portion 41 have a square-figure as shown in FIG. 12 or a U-figure, it is possible to increase the path length without increasing so much moment of inertia about the center axis in the longitudinal direction of the suspension in comparison with a V-figured arm shape, for example, and it is possible for the arm portion 41 to avoid contact with or sliding against the microactuator 9.

Regarding the width of the arm portion 41, since the thickness of the microactuator mounting portion is about 0.15 to 0.3 mm, it is desirable that the width of the arm portion 41 be at least equivalent to the thickness of the microactuator, that is, 0.3 to 0.4 mm from the view point of restraining distribution of sectional shape of the arm portion upon working and the workability.

Figure 5:
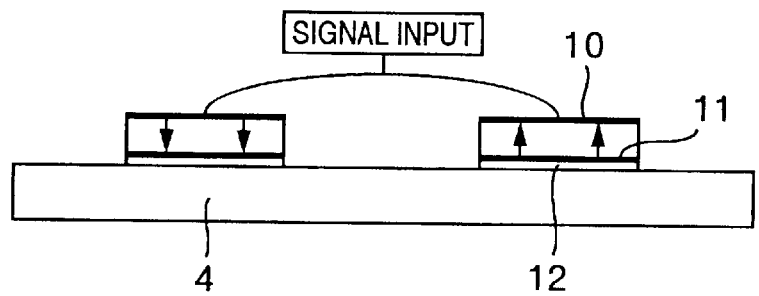
FIG. 5 is a sectional view of microactuator and a microactuator mounting portion of the first embodiment of the present invention.
Figure 6:
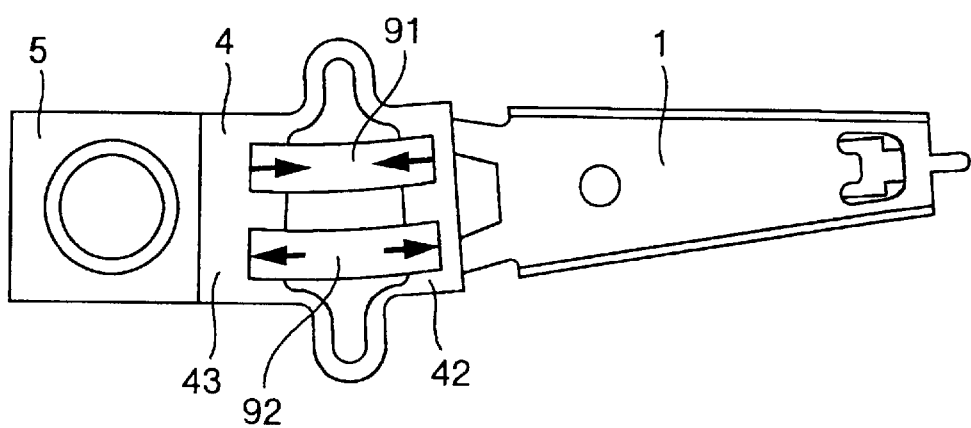
FIG. 6 illustrates a deformed state during operation of the microactuator of the first embodiment of the present invention.

FIG. 5 shows a sectional view of the microactuator 9 and the microactuator mounting portion 4. FIG. 6 shows an example of deformation of the suspension when the microactuator is driven.

Arrows in FIG. 5 show the polarization direction of the piezoelectric elements that make up the microactuator 9. The microactuator 9 is provided with an upper electrode 10 and a lower electrode 11 and is fixed to the microactuator mounting portion 4 through an adhesive 12 having electroconductivity. The microactuator mounting portion 4 is electrically set to 0 potential via the mount 5 and the carriage 6.

As shown in FIG. 5, when a signal is input to the upper electrodes 10, two piezoelectric elements 91, 92 of the microactuator 9 have mutually opposite orientations of polarization, and therefore their directions of expansion and contraction are opposite to one another. As a result, as shown in FIG. 6, for example, the piezoelectric element 91 contracts in the longitudinal direction, while the piezoelectric element 92 expands in the longitudinal direction. This causes the suspension as a whole to deform as shown in FIG. 6 to make it possible to slightly move the slider 3. In this case, the arm portions 41 of the microactuator mounting portion 4 have a structure allowing them to easily deform both in longitudinal and width directions of the suspension as shown in FIG. 6 and therefore, there is no fear to interfere with the operation of the microactuator 9.

With these structure, the microactuator 9 has no part to come into contact with the microactuator mounting portion 4 except the fixed portions. Even in a case where the microactuator 9 is deformed (especially, the load beam 1 is likely to be deformed vertically and horizontally with respect to the mount 5) during an operation or when the magnetic disk apparatus receives an impact, there is no fear that the microactuator 9 slides and that the reliability of the magnetic apparatus is reduced on account of dust generation, because there is no contact portion between the microactuator 9 and microactuator mounting portion 4. Furthermore, when the disk apparatus receives an impact, the microactuator 9 also receives an inertial force of the load beam 1, but since the arm portions 41 of the microactuator mounting portion 4 share the inertial force of the microactuator 9 and thereby alleviates the stress imposed on the microactuator 9. Because of this, the microactuator 9 is less likely to be damaged and the reliability of the magnetic disk apparatus is improved.

When the microactuator with the prior art structure is operating, a microactuator fixing portion of the slider side rotates around an intersection of three support beams. Because of this, the microactuator also must deform following the fixing portion. As a result, the microactuator deforms more than it needs to deform for driving, which increases stress on the microactuator, causing a problem that dust is easily produced due to stress concentration. The present invention, however, allows the arm portion 41 to be flexible in both the longitudinal and width directions of the suspension as shown in FIG. 6, not constraining deformation of the microactuator 9, which makes it possible to reduce the possibility of dust generation and improve the reliability of the magnetic disk apparatus.

Figure 13:
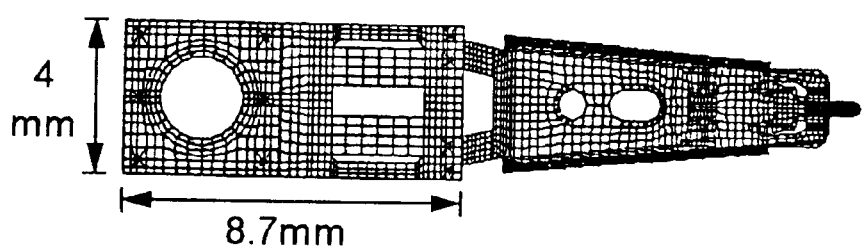
FIG. 13 is a view illustrating various shapes of the arm portion used for calculation.
Figure 13:
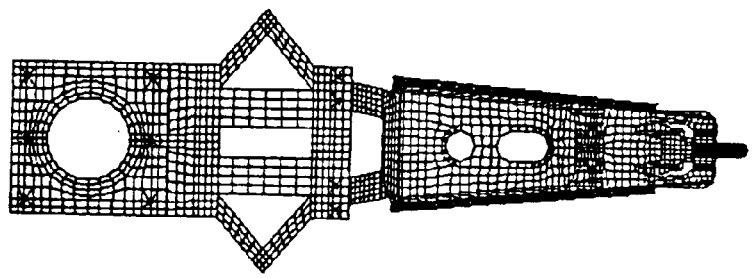
Figure 13:
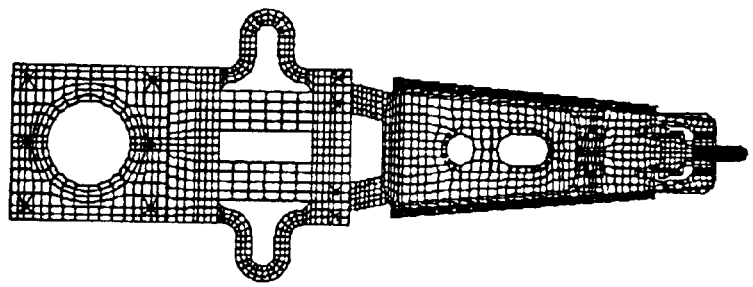
Figure 14:
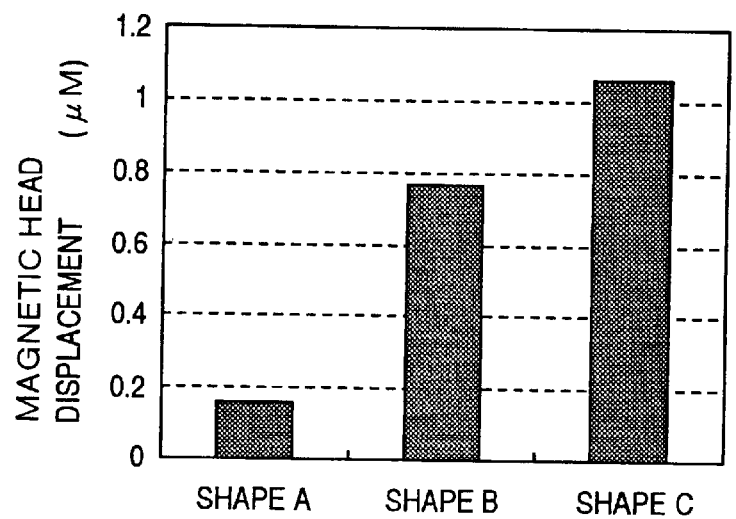
FIG. 14 is a view illustrating a result of calculation of an amount of displacement of the head portion in different shapes of the arm portion.

Next, amounts of displacement in various shapes of the arm portions are calculated and the calculation result will be explained using FIG. 13 and FIG. 14. The piezoelectric elements of the microactuator 9 placed in parallel receive forces in the directions indicated by the arrows shown in FIG. 4. FIG. 13A illustrates a case where parallel arm portions are provided, FIG. 13B illustrates a case where triangular arm portions protruding outward are provided and FIG. 13C illustrates a case where U-figured (substantially semicircular) arm portions protruding outward are provided as shown in the embodiment of FIG. 2 to FIG. 4.

As a calculation condition, a boss portion of the mount 5 is completely fixed assuming that it is fixed to the carriage. Moreover, the slider 3 can freely move on the surface of the disk, and therefore the movement of the slider is constrained in the Z-direction in FIG. 4. In order to simulate extension and contraction of the two piezoelectric elements, a Y-direction displacement of the magnetic head 31 is calculated assuming that a contracting force is applied to one piezoelectric element and a tensile force is applied to the other piezoelectric element as shown in FIG. 4. The magnitude of input is assumed to be 0.5N based on the thickness of the piezoelectric element (0.15 to 0.2 mm), piezoelectric constant (200 to 300 m/V) and input voltage (30 V), etc.

Furthermore, it is also assumed that the width of the arm portion is uniformly 0.4 mm and as shown in FIG. 13, the piezoelectric element mounting portion has a length of 8.7 mm, width of 4 mm and thickness of 0.15 mm. Its material is stainless steel (SUS304) with Young's modulus of 0.19 $N/m^2$. Shape A has a rectilinear arm portion without having a protruding portion outside the suspension. Shape B has a V-figured arm portion whose vertex angle is 80 degrees. Shape C has a U-figured arm portion having a curve instead of a square. The shapes A, B and C are identical with one another except the arm portions thereof. These calculation results are shown in FIG. 14.

Displacement in the element exceeds 1 $\mu$m in shape C, but is approximately 0.77 $\mu$m in Shape B and only 0.16 $\mu$m in Shape A. These results show that Shape C is most flexible, the amount of displacement of the magnetic head is largest when the piezoelectric elements are driven, and even Shape B can be well put into practical use. In the case of Shape A, the piezoelectric elements must produce large displacement and this problem must be solved before it can be put into practical use.

Figure 7:
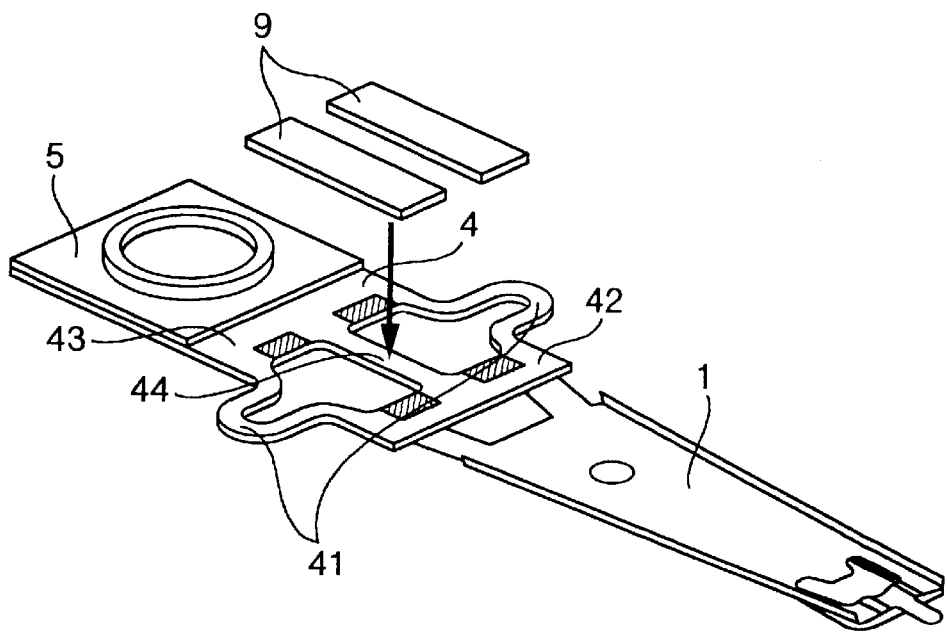
FIG. 7 is a perspective view of a suspension of a second embodiment of the present invention.
Figure 8:
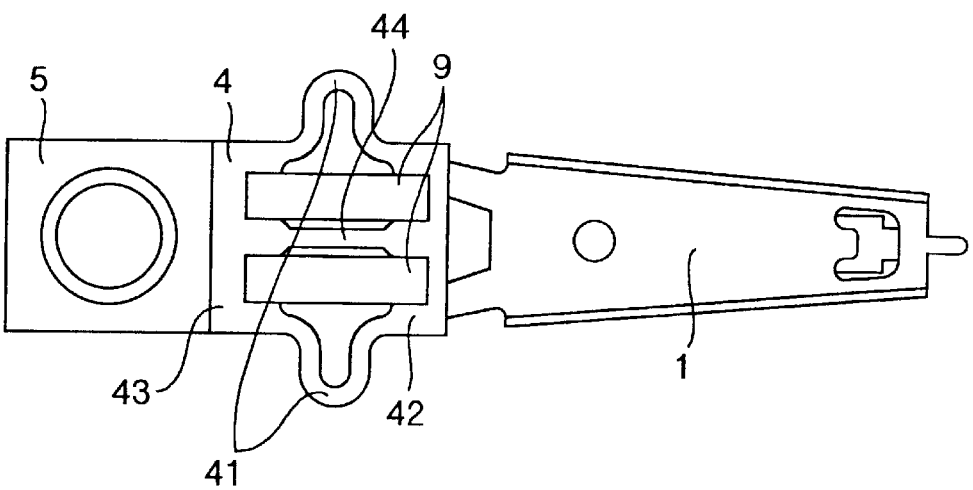
FIG. 8 is a top view of the suspension of the second embodiment of the present invention.

FIG. 7 and FIG. 8 are a perspective view and a top view of a second embodiment of the present invention. In the embodiment shown in FIG. 7 and FIG. 8, a central coupling portion 44 in addition to the arm portions 41 couples the microactuator fixing portion 42 on the magnetic head side and the microactuator fixing portion 43 on the carriage side of the microactuator mounting portion 4. The central coupling portion 44 is placed on the center axis in the longitudinal direction of the suspension and is formed not to interfere with the microactuator 9. In the first embodiment, in order to alleviate stress generated on the microactuator 9 when an external impact is applied, the arm portion 41 can be made rigid to the bending moment in vertical direction applied by the load beam 1. However, if the rigidity of the arm portion 41 becomes too high, there is fear to inhibit the operation of the microactuator 9. Therefore, it is preferable to provide the central coupling portion 44 as shown in FIG. 7 and FIG. 8. The central coupling portion 44 couples the fixed portions before and after the microactuator mounting portion 4 in a rectilinear form, and therefore, it can be made sufficiently flexible in the direction in which the microactuator 9 operates, while its rigidity in the direction perpendicular to the disk surface can be made higher than the arm portion 41. In this way, in the case where an impact in the direction perpendicular to the disk surface is applied, it is possible to further reduce stress on the microactuator 9, thus improving the impact resistance and reliability of the magnetic disk apparatus, in comparison with the first embodiment.

Figure 15:
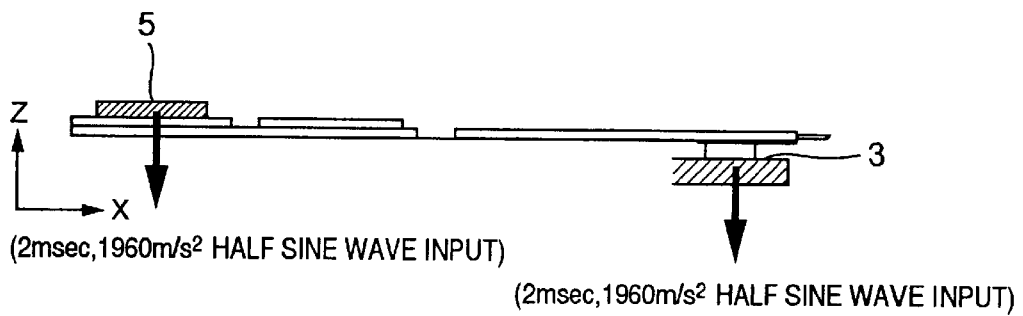
FIG. 15 is a view illustrating a state when an impact is applied to the suspension.
Figure 16:
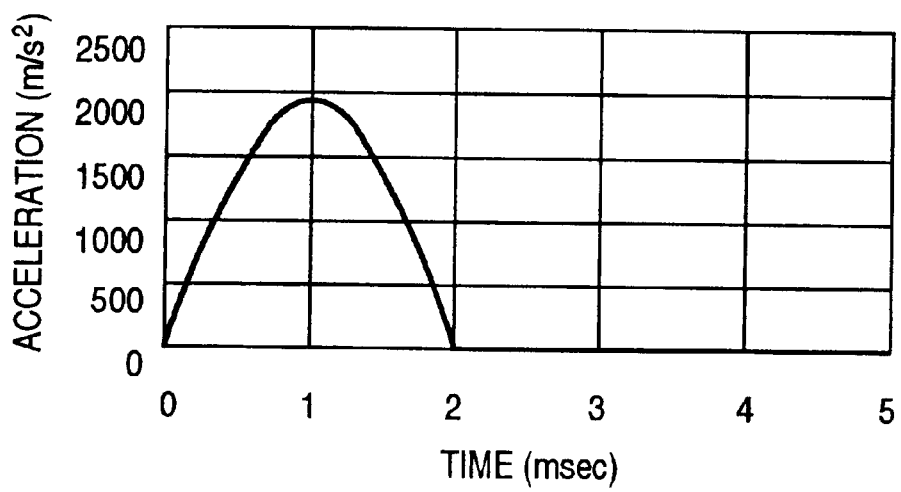
FIG. 16 is a graph showing an acceleration waveform applied to the suspension.

FIG. 15 shows a method of analysis when the central coupling portion 44 is provided. A variation of maximum stress on the piezoelectric elements at the time of receiving an impact in vertical (Z) direction with or without the central coupling portion is calculated using a finite element method. As shown in FIG. 15, an analysis is conducted assuming that a half sine wave of 1960 $m/s^2$ (200 G) is input downward (−Z direction) for 2 msec as shown in FIG. 16. More specifically, since an impact is input to the suspension through the mount boss portion, which is a fixed portion, and the slider, forced acceleration in FIG. 16 is input to the mount boss portion and slider in −Z direction and a time history response analysis is conducted. From that result, maximum stress acting on the piezoelectric elements is obtained. This analysis is conducted on the shape C in FIG. 13. That is, suppose the shape shown in FIG. 7 and FIG. 8 having the central coupling portion 44 is Shape D. The results are shown in FIG. 17.

Figure 17:
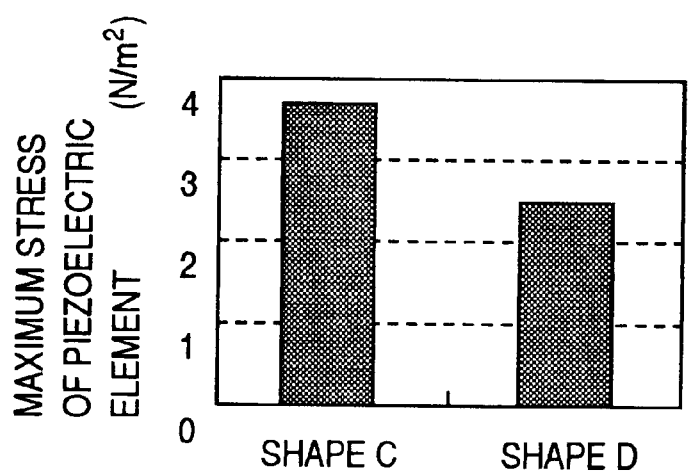
FIG. 17 is a graph showing a result of calculation of stress in a vertical direction in the case where a central coupling portion is provided and in the case where a central coupling portion is not provided.

FIG. 17 shows that maximum stress acting on the piezoelectric elements is 3.72 N/mm$^2$ for Shape C, while it is 2.47 N/mm$^2$ for Shape D with the central coupling portion 44 added, which means a reduction of stress of approximately 38%, showing that the addition of the central coupling portion 44 is effective means for reducing the maximum stress. Here, regarding the structure with this central coupling portion 44, it goes without saying that use of the shape B in FIG. 13 can also move the slider portion to a degree enough to be put into practical use.

Figure 9:
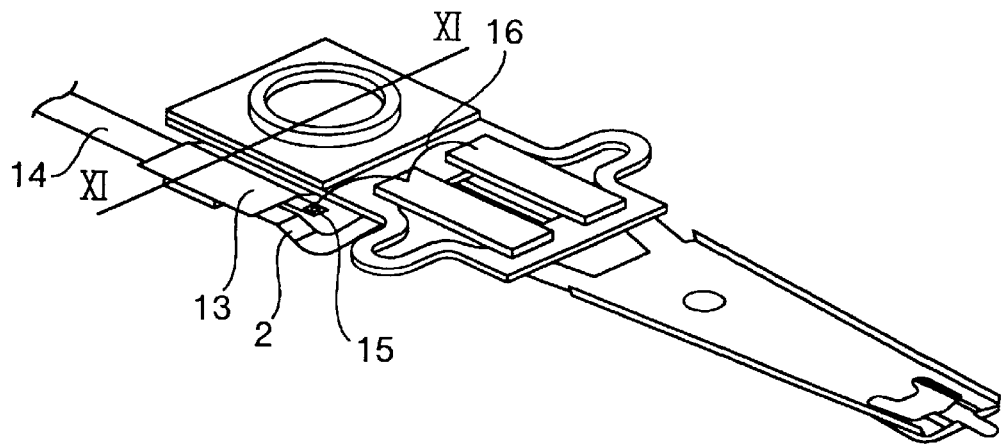
FIG. 9 is a perspective view of a suspension of a third embodiment of the present invention.
Figure 10:
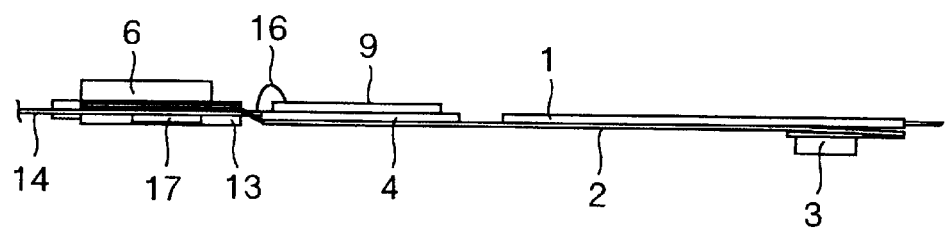
FIG. 10 is a side view of the suspension of the third embodiment of the present invention.
Figure 11:
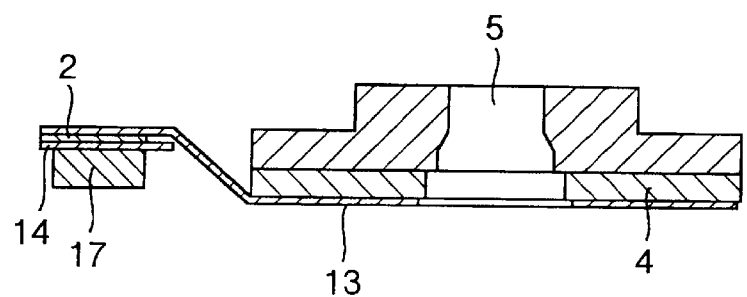
FIG. 11 is a sectional view, taken along line XI—XI in FIG. 9, of the suspension of the third embodiment of the present invention.

FIG. 9 and FIG. 10 are a perspective view and a side view showing a method of wiring to the microactuator 9, which is a third embodiment of the present invention, and FIG. 11 shows a sectional view of the area adjacent to the mount, taken along line XI—XI in FIG. 9.

In FIG. 9 and FIG. 10, a flexure 2 provided with a wiring pattern from the magnetic head extends to the vicinity of the mount 5. Normally, the wiring pattern of the flexure 2 is structure by laminating a polyimide layer, which serves as an insulation layer, and a copper layer, which serves as signal lines on the flexure 2 made of stainless steel such as SUS304. Flexure 2 is fastened to a wiring fixing plate 13 and further electrically connected to a wiring portion 14. An FPC (flexible printed circuit board) is suitable for the wiring portion 14. The wiring portion 14 is provided with a terminal 15 and the terminal 15 and the upper electrode 13 of the microactuator 9 are electrically connected through a signal line 16.

With these structure, signal input to the microactuator 9 can be realized and at the same time it becomes possible to process signal input to microactuator 9 and a signal of the magnetic head all together by the wiring portion 14. This facilitates manufacturing and can lead to a cost reduction. Furthermore, the wiring portion 14 is provided with an IC 17 for signal amplification and the wiring fixing plate 13 is bent. When transmitting information, the information can be amplified, which makes it possible to simplify transmission of information and increase the transfer rate of the magnetic disk apparatus. This further allows a signal line to the IC 17 to be handled easily, thus reducing the manufacturing cost. Furthermore, bending the wiring fixing board 13 prevents the possibility of the IC 17 to come into contact with the disk.

Figure 18:
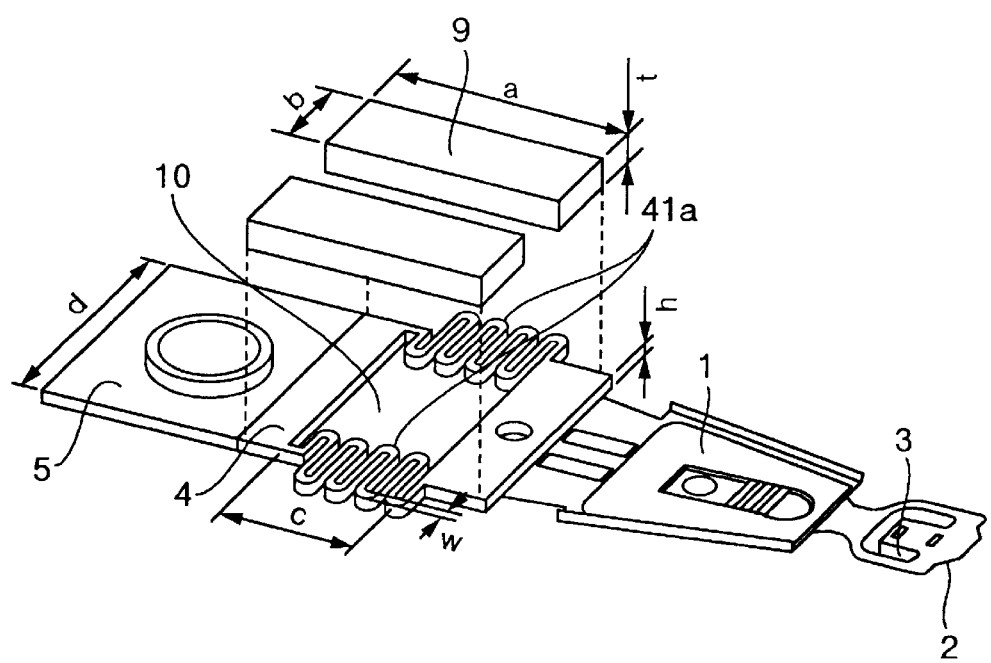
FIG. 18 is a perspective view of a suspension of a fourth embodiment of the present invention.
Figure 19:
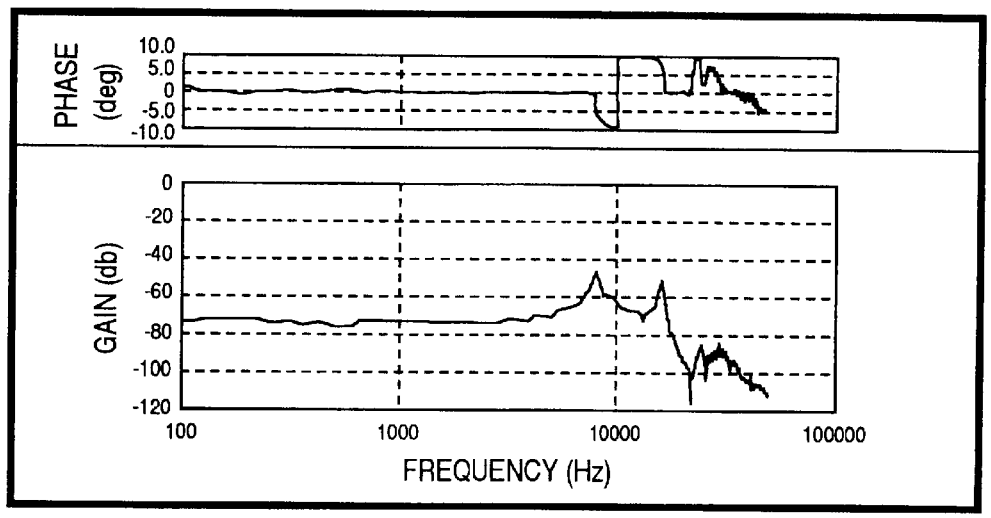
FIG. 19 is a characteristic diagram showing a vibration characteristic of the suspension in FIG. 18.

FIG. 18 shows a structure of a suspension support apparatus according to a fourth embodiment of the present invention. FIG. 19 is a characteristic diagram showing an experimental measurement of the amplitude (dB) in Y-direction and the phase of the magnetic head 31 when the microactuator 9 is driven using the suspension shown in FIG. 18.

The fourth embodiment in FIG. 18 differs from the first embodiment in that bellows-figured arm portions 41a are provided in longitudinal direction of the suspension on both sides of the window portion 10 on the microactuator mounting portion 4. A part of the bellows-figured arm portion is protruded out of both sides of the microactuator mounting portion 4.

In the case where the position of the magnetic head is deviated from a predetermined track of the disk 8 after the voice coil motor is operated to position the magnetic head, this structure adjusts the position of the magnetic head by applying a voltage to the piezoelectric elements 9 to rotate the load beam 1, through extension and contraction of the piezoelectric elements 9, to move the magnetic head in the positioning direction.

For example, suppose the width d of the microactuator mounting portion 4=5.4 mm, thickness h=0.15 mm, length c of the window portion 10=3 mm, width w of bellows-figured arm portion 41a=0.4 mm, length a of the piezoelectric element of the microactuator 9=3.6 mm, width b=0.8 mm, thickness t=0.15 mm. It has been confirmed that by bonding the both ends of the piezoelectric elements of the microactuator 9 to the front and back fixed portions of the microactuator mounting portion 4, applying a voltage of 30 V to the piezoelectric elements of the microactuator 9, it is possible to move the magnetic head portion of the slider 3 in the positioning direction by 1 μm or more.

That is, also in this structure, most parts of the piezoelectric elements of the microactuator 9 other than the portion bonded to the load beam are free with respect to the fixed portion 43 and it is possible to reduce rigidity of the piezoelectric elements of the microactuator 9 themselves against deformation. Furthermore, since the arm portion 41a also has a bellows-figure, which facilitates elastic deformation, rigidity against deformation in expansion and contraction direction is reduced. Therefore, applying a relatively low voltage to the piezoelectric elements of the microactuator 9 makes it possible to increase displacement of the magnetic head.

In addition, as shown in FIG. 19, this embodiment allows the vibration characteristic of the suspension to be flattened to around 8 kHz. That is, using a 2-stage positioning mechanism that positions the magnetic head using the voice coil motor and piezoelectric elements makes it possible to compress disturbance of up to 2 kHz and provide high precision positioning.

Figure 20:
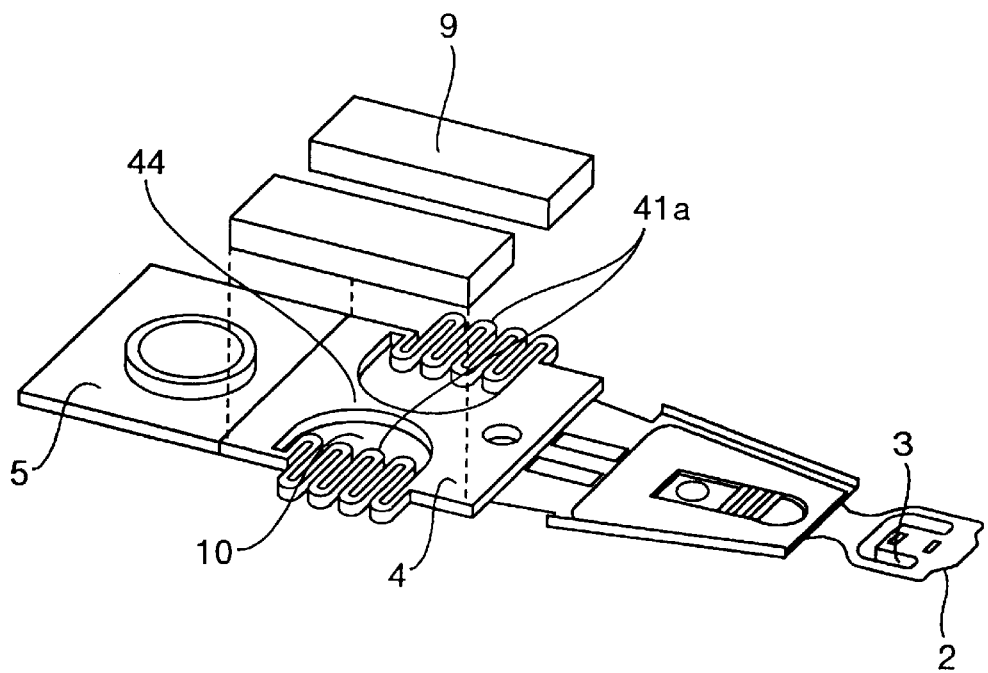
FIG. 20 is a perspective view of a suspension of a fifth embodiment of the present invention.

FIG. 20 is a plan view of a fifth embodiment of the present invention.

The fifth embodiment differs from the third embodiment in that the window portion 10 is divided into two portions by providing the window portion 10 with a semicircular central coupling portion 44. Naturally, the piezoelectric elements of the microactuator 9 of this divided window portion 10 are provided not to come into contact with the arm portions 41a and the central coupling portion 44.

Adopting such a structure, it is possible to move the position of the magnetic head portion by 1 μm or more as in the case of the third embodiment by applying a voltage to the piezoelectric elements of the microactuator 9.

Figure 21:
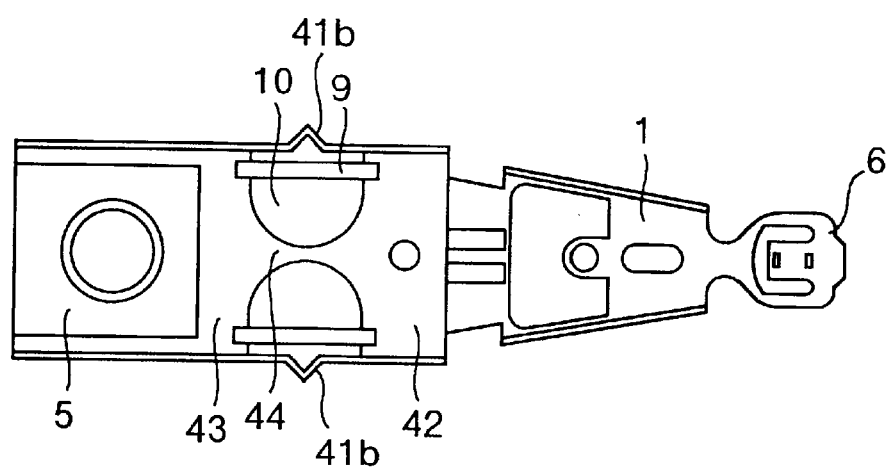
FIG. 21 is a plan view of a suspension of a sixth embodiment of the present invention.

FIG. 21 shows a sixth embodiment.

This embodiment is structured by connecting the microactuator mounting portion 4, from which the arm portions 41a (which are provided at both ends as one body in the fifth embodiment) are removed, with separately processed arm portions 41b. That is, the arm portions 41b are formed by spring members provided with a separate protrusion and attached to the sides of the microactuator mounting portion 4 later. In this way, by adopting a structure in which the parts corresponding to the arm portions are provided later, it is possible to improve workability. Moreover, since the spring members 41b processed separately are used, it is possible to process only the spring member in various protruding forms. That is, instead of the shape used in this embodiment, it is possible to configure the arm portion arbitrarily, in a substantial semicircular shape in the first embodiment, a bellows-shape in the fourth embodiment or in an ellipsoidal shape, etc.

Next, method of mounting the piezoelectric elements, which constitutes the microactuator, will be described hereinafter.

Figure 22:
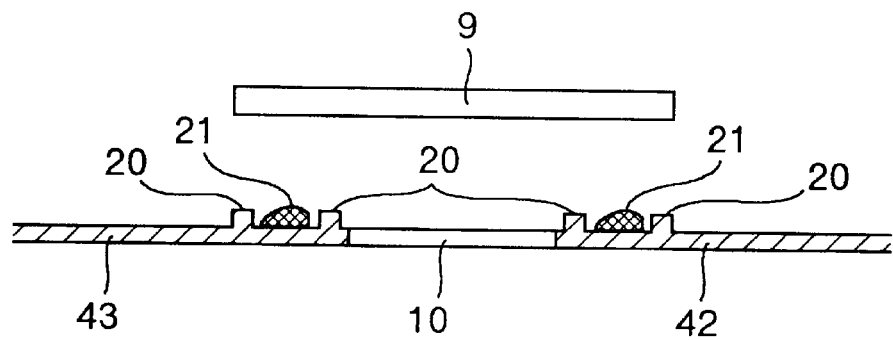
FIG. 22 is a side view showing an example of assembling the suspension of the present invention.

FIG. 22 shows an example of a sectional view of the microactuator mounting portion 4.

This example has a structure in which pairs of protrusions 20 are provided at the fixing portions of the microactuator mounting portion 4 and an adhesive 21 is filled between the protrusions 20 and the piezoelectric elements of the microactuator 9 are bonded by the adhesive 21. By employing this structure in the case where it is not possible to secure a sufficient space between the arm portions or the central coupling portion and the piezoelectric elements of the microactuator, it is possible to move the head smoothly without the piezoelectric elements coming into contact with the central coupling portion and the arm portions.

Here, the protrusions 20 may be structured by a separate member and bonded later using an adhesive or by soldering.

Figure 23:
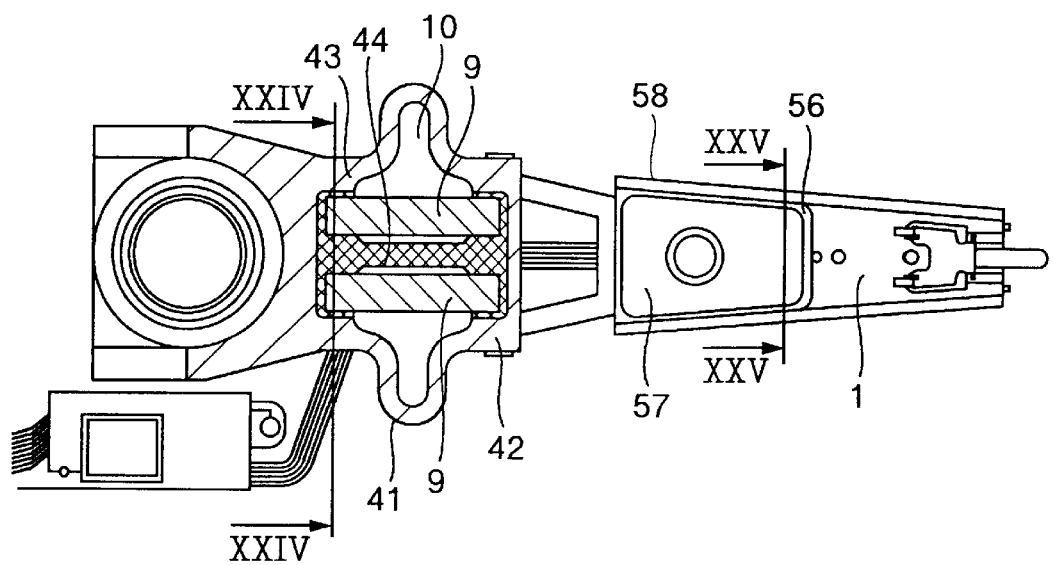
FIG. 23 is a plan view showing another example of assembling the suspension of the present invention.
Figure 24:
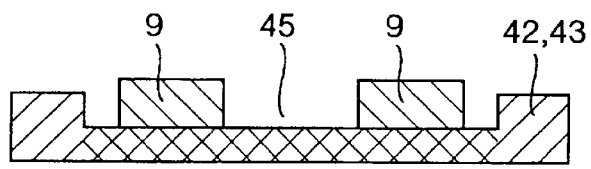
FIG. 24 is a sectional view taken along line XXIV—XXIV in FIG. 23.
Figure 25:
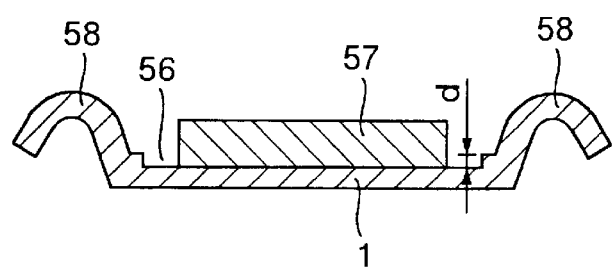
FIG. 25 is a sectional view taken along line XXV—XXV in FIG. 23.

FIG. 23 shows an overall structure of the suspension when the parts mounting portion such as piezoelectric elements is configured as a recessed portion. FIG. 24 shows a cross section, taken along line XXIV—XXIV in FIG. 23, of the piezoelectric element mounting portion of the microactuator mounting portion 4. FIG. 25 shows a cross section, taken along line XXV—XXV in FIG. 23, of the load beam.

On the load beam 1, a cavity 56 is formed in a surface opposite to the surface on which the slider 3 is placed (see FIG. 25) and a damping member 57 to suppress vibration of the load beam 1 is bonded in the cavity 56. The thickness of a bottom of the cavity 56 is thinner than the other portions of the load beam 1. That is, with reference to FIG. 25, the thickness of the bottom of the cavity 56 is thinner than the other parts of the load beam 1 by d.

Here, the load beam 1 itself may be an elastic member or it is also possible to provide an elastic member in the location where the microactuator mounting portion 4 and the load beam 1 are connected to provide an elastic function as a whole. Flanges 58 shown in FIG. 25 are intended to increase rigidity without increasing the weight of the load beam 1 and increase the natural frequency of the magnetic head support mechanism and formed on both sides of the load beam 1 in the form shown in FIG. 25.

Since the vibration damping member 57 is placed in the cavity 56 of the load beam 1 of this embodiment, the height of the damping member 57 does not exceed that of the flanges 58 of the load beam 1 and it is possible to set the overall height of the magnetic head support mechanism to almost the same height as that of the magnetic head support mechanism without the damping member 57. In the case where the damping member 57 is pasted onto the load beam 1 without forming the cavity 56, the height of the surface of the damping member 57 exceeds the height of the flanges 58, so that the thickness of the head support mechanism is increased.

In the above description, as described in the embodiment of the present invention, the structure example that the vibration damping member 57 is placed in the cavity 56 of the load beam 1 is described. However, instead of the vibration damping member, an R/WIC (IC circuit for recording/reproduction processing) may be placed in the cavity 56 or the wiring for connection with the head may be placed in the cavity by extending the cavity 56 in the longitudinal direction of the load beam 1.

Between the load beam 1 of the magnetic head support mechanism and a coarse adjustment actuator for moving the magnetic head, the microactuator mounting portion 4 is provided which mounts the piezoelectric element of the microactuator (PZT actuator) 9, which is one of solid microactuators. This has almost the same structure as that shown in FIG. 2, but differs in that a cavity 45 is provided in the microactuator mounting portion 4 where the microactuator 9 is bonded. In the first embodiment, the recessed portions are formed at only the bonding portions for the microactuator by etching, etc. In this embodiment, the cavity 45, which is greater than the piezoelectric elements of the microactuator 9, is formed and the piezoelectric elements of the microactuator 9, a kind of solid actuator, are bonded and placed therein. The window portion 10 is provided in the cavity 45 of the microactuator mounting portion 4.

Since the microactuator 9 is placed in the cavity 45, it is possible to make the magnetic head support mechanism thinner in comparison with the case where the cavity 45 is not formed. Furthermore, since it is possible to operate the piezoelectric elements of the microactuator 9 near a center in the thickness direction of the microactuator mounting portion 4, it is possible to reduce cross actions in vertical or torsional direction of the magnetic head support mechanism caused by driving the piezoelectric elements the microactuator 9.

When focused only on implementation of a thinner magnetic head support mechanism, it goes without saying that this embodiment can be applied to prior art magnetic head support mechanisms in which no microactuator is provided.

This embodiment is described of the structure in which the piezoelectric element type microactuator is mounted, but the present invention is not limited to this structure and is also applicable to cases where a magnetostrictive actuator, optostrictive actuator, bimetal actuator or shape-memory alloy actuator, etc. is mounted.

In this embodiment, the cavity 56 of the load beam and the cavity 45 of the microactuator mounting portion 4 can be formed by half-etching or rolling working. Furthermore, by bonding a slider 3 provided with a magnetic head onto a slider mounting surface of a magnetic head support mechanism, a head assembly called "HGA (Head Gimbal Assembly) is formed and the technology of the present invention is naturally applicable to such head assembly.

What is claimed is:

1. The magnetic disk apparatus, comprising:

a disk to which information is recorded;

a magnetic head to read/write information from/to said disk;

a suspension to support the magnetic head, the suspension including a load beam being flexible in a direction substantially perpendicular to said disk;

a carriage to hold the suspension;

a coarse adjustment actuator to drive said carriage;

a microactuator for micro motion; and a microactuator mounting portion provided between the carriage and the load beam of the suspension, said microactuator mounting portion being separate from the load beam of the suspension and coupled thereto, said microactuator mounting portion being substantially rigid in the direction substantially perpendicular to said disk, said microactuator being mounted in said microactuator mounting portion;

wherein at least one window is provided in said microactuator mounting portion; and outer frame portions of said microactuator mounting portion that do not cross a centerline in a longitudinal direction of the suspension are structured by flexible coupling members which are extensible and contractible in the longitudinal direction of the suspension, and said outer frame portions are disposed outside the microactuator; and wherein said outer frame portions are configured in a shape protruding outward from side surface of said carriage.

2. The magnetic disk apparatus, comprising:

a disk to which information is recorded;

a magnetic head to read/write information from/to said disk;

a suspension to support the magnetic head, the suspension including a load beam being flexible in a direction substantially perpendicular to said disk;

a carriage to hold the suspension;

a coarse adjustment actuator to drive said carriage;

a microactuator for micro motion; and a microactuator mounting portion provided between the carriage and the load beam of the suspension, said microactuator mounting portion being separate from the load beam of the suspension and coupled thereto, said microactuator mounting portion being substantially rigid in the direction substantially perpendicular to said disk, said microactuator being mounted in said microactuator mounting portion;

wherein at least one window is provided in said microactuator mounting portion; and outer frame portions of said microactuator mounting portion that do not cross a centerline in a longitudinal direction of the suspension are structured by flexible coupling members which are extensible and contractible in the longitudinal direction of the suspension, and said outer frame portions are disposed outside the microactuator; and wherein said outer frame portions are structured by substantially semicircular members protruding outward from side surfaces of said carriage.

3. A magnetic disk apparatus, comprising:

a disk to which information is recorded;

a magnetic head to read/write information from/to said disk;

a suspension to support the magnetic head, the suspension including a load beam being flexible in a direction substantially perpendicular to said disk;

a carriage to hold the suspension;

a coarse adjustment actuator to drive said carriage;

a microactuator mounting portion provided between said carriage and the load beam of said suspension, the microactuator mounting portion being separate from the load beam of said suspension and coupled thereto, the microactuator mounting portion being substantially rigid in the direction substantially perpendicular to said disk; and a microactuator mounted in the microactuator mounting portion and comprising a first actuator element and a second actuator element placed substantially symmetric with respect to a longitudinal direction of said suspension by whose expansion and contraction action micro motion of the magnetic head is performed;

wherein a window portion is provided in said microactuator mounting portion; and outer frame portions of said microactuator mounting portion that do not cross a center line in the longitudinal direction of the suspension are structured by flexible coupling members, which are extensible and contractible in the longitudinal direction of the suspension, and said outer frame portions are placed outside the microactuator with respect to the centerline in the longitudinal direction of the suspension, and a central coupling portion is provided between said first and second actuator elements of said microactuator and on the center line in the longitudinal direction of the suspension and dividing the window portion so as to provide first and second window portions at opposite sides of the central coupling portion.

4. The magnetic disk apparatus according to claim 3, wherein said microactuator mounting portion has a thickness which is greater than a thickness of a planar portion of the load beam of the suspension.

5. The magnetic disk apparatus according to claim 3, wherein the load beam of the suspension is coupled to said microactuator mounting portion by welding.

6. The magnetic disk apparatus according to claim 3, wherein the load beam of the suspension has flanges which are bent in a direction away from the disk.

7. The magnetic disk apparatus according to claim 3, wherein said microactuator is fixed on a surface of said microactuator mounting portion which is on an opposite side of said microactuator mounting portion with respect to the surface of said microactuator mounting portion which is on a side facing said disk.

8. The magnetic disk apparatus according to claim 3, wherein said microactuator mounting portion has a cavity formed thereon.

9. A magnetic disk apparatus, comprising:

a disk to which information is recorded;

a magnetic head to read/write information from/to said disk;

a suspension to support the magnetic head, the suspension including a load beam being flexible in a direction substantially perpendicular to said disk;

a carriage to hold the suspension;

a coarse adjustment actuator to drive said carriage; and a microactuator for micro motion mounted in a microactuator mounting portion provided between said carriage and the load beam of said suspension, the microactuator including at least one microactuator element spanning at least one window in the microactuator mounting portion, the microactuator mounting portion being separate from the load beam of said suspension and coupled thereto, the microactuator mounting portion being substantially rigid in the direction substantially perpendicular to said disk;

wherein a first actuator fixing portion on the carriage side and a second actuator fixing portion on the magnetic head side of said microactuator mounting portion are coupled by two flexible outer arm portions of the microactuator mounting portion, which are substantially symmetric with respect to a longitudinal direction of the suspension, and the flexible outer arm portions have a convex shape protruding outward with respect to the centerline in the longitudinal direction of the suspension and allow micro motion by the microactuator.

10. A magnetic disk apparatus, comprising:

a disk to which information is recorded;

a magnetic head to read/write information from/to said disk;

a suspension to support the magnetic head, the suspension including a load beam being flexible in a direction substantially perpendicular to said disk;

a carriage to hold the suspension;

a coarse adjustment actuator to drive said from/to carriage; and a microactuator for micro motion mounted in a microactuator mounting portion provided between said carriage and the load beam of said suspension, the microactuator including at least one microactuator element spanning at least one window in the microactuator mounting portion, the microactuator mounting portion being separate from the load beam of said suspension and coupled thereto, the microactuator mounting portion being substantially rigid in the direction substantially perpendicular to said disk;

wherein a first actuator fixing portion on the carriage side and a second actuator fixing portion on the magnetic head side of said microactuator mounting portion are coupled by two flexible outer arm portions of the microactuator mounting portion, which are substantially symmetric with respect to a longitudinal direction of the suspension and one inner arm portions and the flexible outer arm portions have a convex shape protruding outward with respect to a centerline in the longitudinal direction of the suspension and allow micro motion by the microactuator, and the inner arm portion is placed on the centerline in the longitudinal direction of the suspension, the inner arm portion being spaced from a respective one of the flexible outer arm portions by the at least one window.

11. A head support mechanism, comprising:

a flexure to flexibly support a slider equipped with a magnetic head to read/write information from/to a magnetic disk;

a load beam to provide the slider with an appropriate load, the load beam being flexible in a direction substantially perpendicular to the disk;

a microactuator mounting portion equipped with a microactuator, the microactuator mounting portion being separate from the load beam of said suspension and coupled thereto, the microactuator including at least one microactuator element spanning at least one window in the microactuator mounting portion, the microactuator mounting portion being substantially rigid in the direction substantially perpendicular to said disk, the microactuator being mounted in the microactuator mounting portion; and a fixing portion to fix to a carriage, wherein a first actuator fixing portion on the carriage side which fixes the microactuator mounting portion to the carriage and a second actuator fixing portion on the magnetic head side of said microactuator mounting portion which fixes the microactuator mounting portion to the load beam are coupled by two flexible outer arm portions of the microactuator mounting portion, which are substantially symmetric with respect to a longitudinal direction, and the flexible outer arm portions have a convex shape protruding outward with respect to the centerline in the longitudinal direction of the load beam and allow micro motion by the microactuator.

12. A head support mechanism, comprising:

a flexure to flexibly support a slider equipped with a magnetic head to read/write information from/to a magnetic disk;

a load beam to provide the slider with an appropriate load, the load beam being flexible in a direction substantially perpendicular to the disk;

a microactuator mounting portion equipped with a microactuator, the microactuator mounting portion being separate from the load beam of said suspension and coupled thereto, the microactuator including at least one microactuator element spanning at least one window in the microactuator mounting portion, the microactuator mounting portion being substantially rigid in the direction substantially perpendicular to said disk, the microactuator being mounted in the microactuator mounting portion; and a fixing portion to fix to a carriage;

wherein a first actuator fixing portion on the carriage side which fixes the microactuator mounting portion to the carriage and a second actuator fixing portion on the magnetic head side of said microactuator mounting portion which fixes the microactuator mounting portion to the load beam are coupled by two flexible outer arm portions of the microactuator mounting portion, which are substantially symmetric with respect to a longitudinal direction and one inner arm portion and allow micro motion by the microactuator, and the flexible outer arm portions have a convex shape protruding outward with respect to the centerline in the longitudinal direction of the load beam and the inner arm portion is placed on the centerline in the longitudinal direction of the load beam, the inner arm portion being spaced from a respective one of the two flexible outer arm portions by the at least one window.

* * * * *